G. W. WHITE.
RETAINING DEVICE FOR SCREWS OR BOLTS.
APPLICATION FILED FEB. 16, 1921.
1,396,611. Patented Nov. 8, 1921.
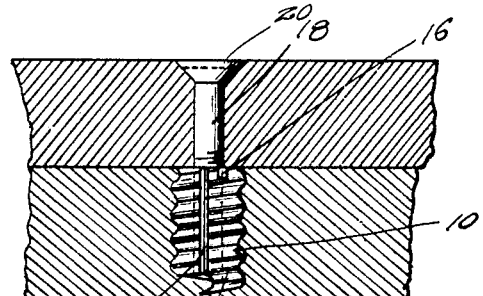
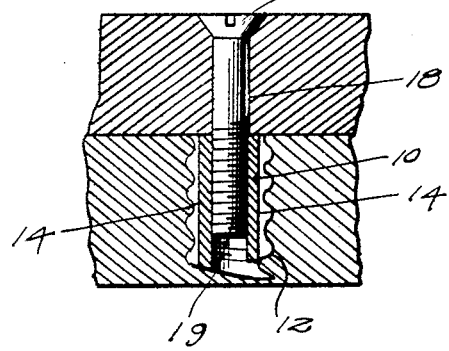
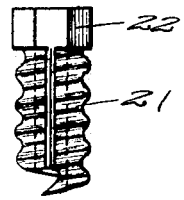
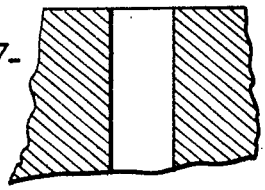
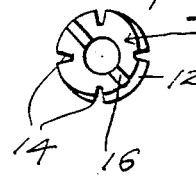
Inventor
G. W. White
By [signature], Attorney

UNITED STATES PATENT OFFICE.

GEORGE W. WHITE, OF ATLANTA, GEORGIA.

RETAINING DEVICE FOR SCREWS OR BOLTS.

1,396,611.  Specification of Letters Patent.  Patented Nov. 8, 1921.

Application filed February 16, 1921. Serial No. 445,412.

*To all whom it may concern:*

Be it known that I, GEORGE W. WHITE, a citizen of the United States, residing at Atlanta, in the county of Fulton and State of Georgia, have invented certain new and useful Improvements in Retaining Devices for Screws and Bolts; and I do hereby declare the following to be a full, clear, and exact description of the invention, such as will enable others skilled in the art to which it appertains to make and use the same.

This invention relates to a retaining device for screws and bolts, and the object is to provide an elongated element adapted to be received within a bore provided for the purpose, and designed to constitute a socket or anchor for a threaded bolt or screw, so that the element last named may be withdrawn as often as may be necessary, and may be again inserted in the same position, positive engagement being secured for an indefinite period.

A still further object is to provide a sleeve which may be threaded internally and externally, and may be received within the bore in a given structural element, the internal thread coöperating with the thread of a machine screw or bolt passing through another structural element, to be connected with that first named.

A still further object is to provide, in a construction of the character indicated, a plurality of channels or grooves extending longitudinally of the sleeve, or anchor element, for the purpose of preventing the rotation of the sleeve in a reverse direction, after once being seated, such reverse rotation acting if permitted, to allow the structural elements connected, to be partly separated.

A still further object is to provide an anchor of simple construction, and one which may be provided with a transverse slot at one end, permitting it to be driven into position by the use of a screw driver, and further to provide a socket or anchor suitable for use in anchoring casters to articles of furniture, and suitable for other similar uses.

With the foregoing and other objects in view, the invention consists in the novel construction, combination, and arrangement of elements hereinafter described and claimed.

In the accompanying drawings:

Figure 1 is a view illustrating the application of my screw and bolt retaining device the members connected by the bolt and retaining device being in vertical section.

Fig. 2 is a view similar to Fig. 1 with the retaining device in vertical section.

Fig. 3 is a detail view in end elevation of the retaining device, and

Fig. 4 is a view in side elevation of a slightly modified form of the retaining device, the device being shown in position for insertion into the socket of a piece of timber or member.

In carrying out my invention I provide an element which may be termed a socket, anchor, or sleeve, this element being designated 10 and being provided with an internal bore, threaded as shown. Under certain conditions it may be desirable to use an element which is not drilled or threaded until after it is seated within a bore drilled in the structural element to which another element is to be connected.

The sleeve 10 is further provided with an external thread, terminating at the lower end at the point shown, the thread being designated 12, and the spirals being intersected by longitudinal channels or grooves 14, the channels preventing the reverse movement of the sleeve after being seated. A transverse slot 16 is formed in one end of the sleeve, and permits the latter to be turned or driven into position by the use of a screw driver, the operation being similar to that employed in driving a screw independently of any separate anchor or socket.

A machine screw is designated 18 and includes the threaded portion 19 and the head 20, provided with the usual transverse slot. I have also shown in the drawings a bolt 21 provided with a head 22 of such form that it may readily be engaged by an ordinary wrench. When the socket member 10 is to be seated in an element of wood, the bore is to be made of less diameter than the greatest diameter of the socket member, in order that there may be positive engagement.

It will be observed that in the event of the stripping of the tread within the bore or socket member, this member may be removed, by the use of a screw driver, and a new socket inserted in place of the damaged one.

Although the device is capable of quite general application, it may be observed that it is particularly useful where the elements to be connected, must be disengaged from time to time. The device has been found to be of special use for securing the removable boards of the body of an automobile. A socket with an unthreaded bore may also be used for mounting the casters in the legs of articles of furniture.

What is claimed is:—

A device of the class described comprising a tubular element having an external thread one end of which terminates in a cutting point, and the tubular element being provided with spaced longitudinal channels interrupting the thread, and one end of a tubular element having a transverse slot, and an element threaded into the bore, the tubular element being adapted for reception within the bore of a structural element, and the device threaded into the tubular element serving to retain another structural element in engagement with that first named.

In testimony whereof I affix my signature in presence of two witnesses.

GEORGE W. WHITE.

Witnesses:
H. B. COBB,
FRANK GUESS.